Figure 1:
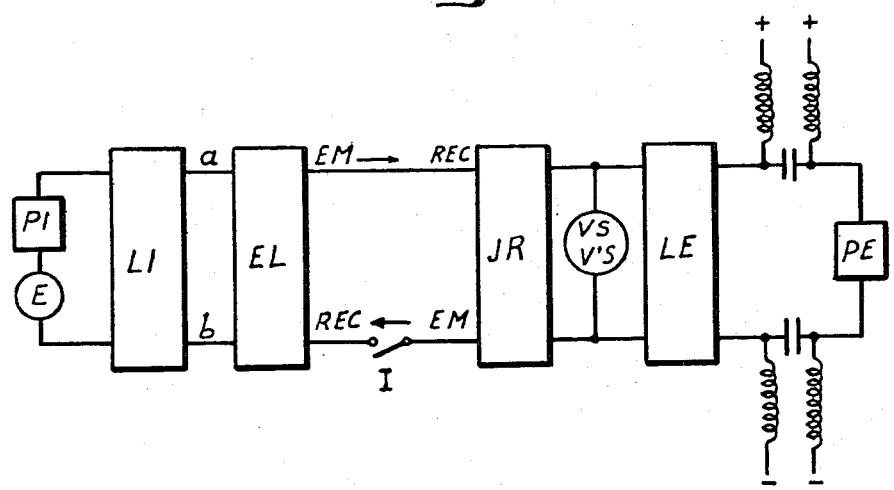

United States Patent [19]

Chataignon et al.

[11] 4,292,479
[45] Sep. 29, 1981

[54] SEPARATION AND BALANCE DEVICE FOR TELEPHONE EXCHANGES

[75] Inventors: André Chataignon, Argenteuil; Alain Nicolas, Courbevoie; Jean P. Poirier, Saint Denis, all of France

[73] Assignee: Le Materiel Telephonique Thomson-CSF, Colombes, France

[21] Appl. No.: 75,799

[22] Filed: Sep. 14, 1979

[30] Foreign Application Priority Data

Sep. 19, 1978 [FR] France ............................ 78 26822

[51] Int. Cl.³ .............................................. H04B 1/58
[52] U.S. Cl. ............................................. 179/170 NC
[58] Field of Search ........ 179/170 NC, 170 T, 170 R, 179/170 T, 170 NC

[56] References Cited

U.S. PATENT DOCUMENTS

| 3,689,710 | 9/1972 | Colardelle et al. | 179/170 T |
| 3,973,089 | 8/1976 | Puckette | 179/170 NC |
| 4,034,166 | 7/1977 | Hollis | 179/170 NC |
| 4,041,252 | 8/1977 | Cowden | 179/170 NC |
| 4,053,722 | 10/1977 | Nahay | 179/170 NC |

FOREIGN PATENT DOCUMENTS 2450853 4/1975 Fed. Rep. of Germany ...... 179/170 NC

OTHER PUBLICATIONS

J. R. Sergo, Jr.; "DSS Quad Line Circuit"; The International Symposium on Subscriber Loops and Services Conference Record; Mar. 1978.

D. E. Fisk and M. E. Homan; "Balanced Electronic Hybrid Circuits"; IBM Technical Disclosure Bulletin; vol. 16, No. 2; Jul. 1973; pp. 495, 496.

Primary Examiner—Bernard Konick
Assistant Examiner—Randall P. Myers
Attorney, Agent, or Firm—Roland Plottel

[57] ABSTRACT

The invention relates to automatic outgoing and incoming channel balance and separation circuits between local telephone set lines and network junctors. The separation circuit associated with the telephone set lines possesses an electronic line feed circuit and a separator constituted by an operational amplifier whose output is connected via two equal resistors in series to one of the outputs of the electronic supply circuit, the junction of these two resistors being connected to the output of this separation circuit. The separation circuit associated with the junctor possesses two input amplifiers connected to the network via output resistors of equal value, one terminal of one of these output resistors being connected via a passive resistive and capacitative network to an operation amplifier, and the other terminal of this resistor being connected via a single resistor to this operational amplifier. Balance is provided for given values of the passive network components and for a given value of line impedance seen by the first separation circuit. The device possesses no adjustable components or transformers, and can be easily produced as an integrated circuit.

11 Claims, 3 Drawing Figures

SEPARATION AND BALANCE DEVICE FOR TELEPHONE EXCHANGES

The present invention relates to automatic devices for balancing and separating the outgoing and incoming channels of telephone networks.

Balance and separation devices are particularly suitable for entirely electronic exchanges which are essentially characterized by very low size and cost made possible by the use of semiconductor technology, such as those of the complementary metal-oxide type. In particular, they allow the use of analogue switches in a switching network of the space-division type, thereby eliminating many of the disadvantages of former devices: excessive cost and size and also carrier currents, power supplies, transformers, ferrite components, etc.

The problem of balance between two outgoing and incoming channels was formerly solved by means of differential transformers whose lack of accuracy, high cost and the need of balance circuit adjustment to match different line lengths constitute major disadvantages.

The subject of the present invention is a device for separating outgoing and incoming channels and automatically balancing these channels for a communication over the network, the said device not having the disadvantages of former devices.

The switching network which establishes the speed connection between two parties uses two separate channels: the outgoing channel which requires the speech signal from the user's telephone set for transmitting it to the other party, and the incoming channel which transmits to the user's telephone set the speech signal from the said other party. It is therefore necessary to convert these two one-way independent channels into a single two-way channel materialized by the two wires (hereinafter designated a and b) of the user's telephone set.

In accordance with the present invention, the device for separating and balancing outgoing and incoming channels possesses separation and balance equipments associated with the telephone set lines and with the junctors, each equipment associated with the telephone set lines possessing an electronic power supply device and a separator consisting of a first operational amplifier whose input is connected to two equal-value resistors, one being connected to the output of the electronic power supply device and the other to the output of a second operational amplifier, the latter being connected to the telephone set lines, and each equipment associated with a junctor possessing two amplifiers connected in parallel by their inputs to the output of a line circuit, their outputs being connected to the inputs of the junctor by output resistors each equal to half of the line load resistance, these amplifiers having gains of $+1$ and $-1$ respectively, the output of one of the said amplifiers being connected via a passive network to one of the inputs of an operational amplifier, the other terminal of the corresponding output resistor being connected to the other input of the said operational amplifier via another resistor.

Figure 2:
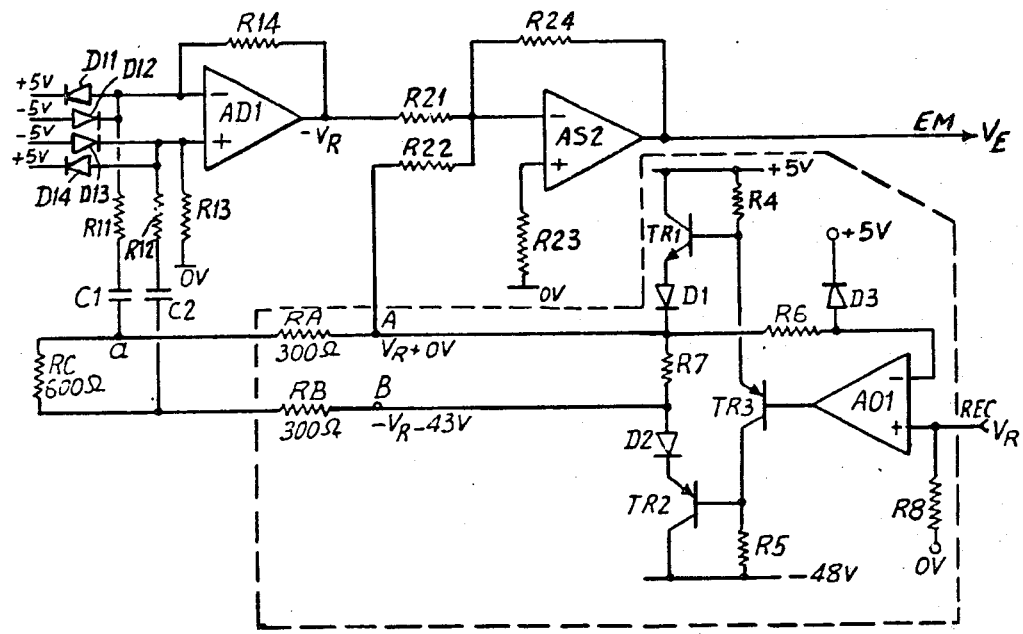
Figure 3:
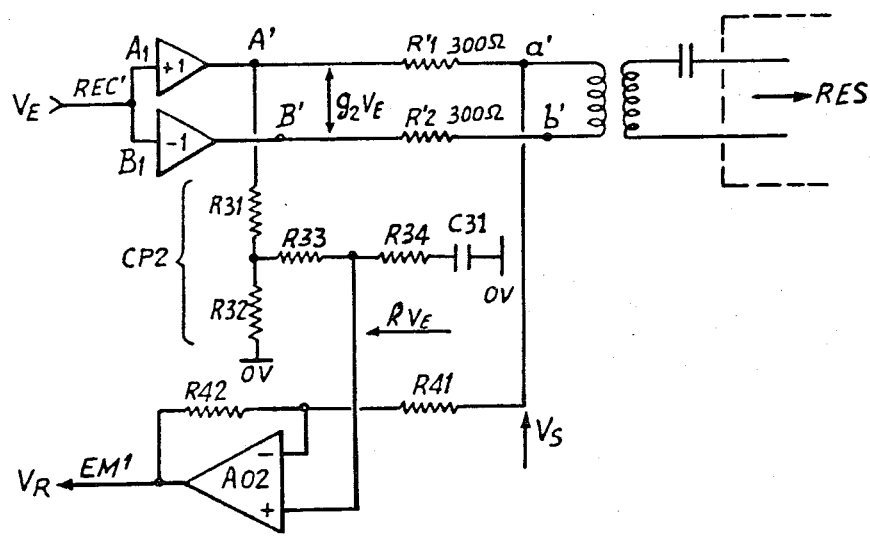

The present invention may be more easily understood from the detailed description of a practical device taken as a non-limiting example and illustrated by the appended drawing in which:

FIG. 1 is a block diagram of the circuits connecting an internal telephone set to an external telephone set, FIG. 2 is the detailed circuit diagram of a separator inserted in the line equipment side and in accordance with the present invention, and FIG. 3 is the circuit diagram of a separator inserted in the network junctor side.

FIG. 1 schematically represents all the circuits connecting an internal telephone set PI to an external telephone set PE via the internal lines LI of the line equipment EL with outgoing/incoming separator EM/REC, and on the external side, the corresponding equipments: network junctor JR and external lines LE. In order to determine the balance characteristics of the device described by the invention, a voltage E is injected and the output voltage VS is measured without side-tone, i.e. with switch I open and V'S with side-tone, i.e. with switch I closed.

In the example described below, the condition $20 \log VS/V'S < 1$ dB is imposed for the frequency range 300 to 3400 Hz. The purpose of the invention consists in balancing in this case by means of two different devices, one for the line equipment and the other for the network junctor.

It is the complementary of these two circuits which provides balance to within 1 dB over the frequency band considered.

An electronic power supply device is outlined by a dashed line in FIG. 2.

The user's telephone set connected to points a and b is fed with $+5$ V via transistor TR1, diode D1 and resistor RA, and with $-48$ V via resistor RB, diode D2 and transistor TR2. The junction of RA and the cathode of D1 is designated A, whilst the junction of RB and the anode D2 is designated B. A resistor R7 is connected between A and B.

The power supply circuit consists essentially of a DC amplifier consisting of operational amplifier A01 and transistors TR1, TR2 and TR3. The emitter of TR3 is connected to the base of TR1 as well as to the $+5$ V via a resistor R4. The collector of TR3 is connected to the base of TR2 as well as to the $-48$ V via a resistor R5. The positive input of A01 is connected via resistor R8 to 0 V and constitutes the input terminal REC of the device shown in FIG. 2, this input being fed with signals $V_R$. The negative input of A01 is connected via a diode D3 to the $-5$ V and via a resistor R6 to A.

This DC amplifier is provided with complete negative feedback resistor R6, such that the voltage on A follows that on input REC.

In addition, since the emitter and collector currents of transistor TR3 are practically identical, the voltage drops across resistors R4 and R5 are the same if $R4 = R5$.

The collector-to-emitter voltages of transistors TR1 and TR2 are therefore equal, such that point A is at 0 V in the rest condition, corresponding to a voltage difference of 5 V with respect to the $+5$ V supply terminal, and B is at $-43$ V.

The telephone set connected to points a and b is thus fed via resistors RA and RB between points A and B, which are at 0 V and $-43$ V respectively. In the present practical example, these two resistors have values of 300 ohms.

When a low-frequency signal VR is applied to input REC, it is fed without attenuation to point A and with a change of sign to point B.

The signals fed to a and b of the telephone set line are thus balanced. If this line is loaded with RC having a total resistance of 600 ohms, the voltage across its terminals is equal to the input voltage on REC. This input voltage is obtained from the speech connection paths of the switching network via the switches.

When ringing is present, point A can, for example, rise to 100 V and point B can descend to −150 V.

In this case, diodes D1 and D2 protect transistors TR1 and TR2 respectively, whilst diode D3 protects amplifier A01. A voltage VR is therefore obtained on A, whilst a voltage =VR −43 V is obtained on B. If the value of each of the resistors RA and RB is 300 ohms and if the line to which the local telephone set is connected is loaded by a 600-ohm resistor RC, circuit AabB acts as a resistive voltage divider and point a is at a voltage of (VR/2)−10.75 V, whilst point b is at a voltage of −(VR/2)−32.25 V.

Point a is connected by a capacitor C1 and a resistor R11 to the negative input of an operational amplifier AD1. This negative input of AD1 is also connected to the +5 V and −5 V via diodes D11 and D12 respectively, these diodes being connected in a manner opposing these voltages. Point b is connected via a capacitor C2 and a resistor R12 to the positive input of AD1, this input also being connected 0 V via a resistor R13 to the −5 V and +5 V via diodes D13 and D14 respectively, these diodes being connected in a manner opposing the voltages. A resistor R14 connects the output of AD1 to its negative input. The output of AD1 is connected by a resistor R21 to the negative input of another operational amplifier AS2. The positive input of AS2 is connected to 0 V via a resistor R23. A resistor R24 connects the output of AS2 to its negative input. The output EM of AS2 constitutes the output of the device of FIG. 2 and produces a signal $V_E$.

Beyond capacitors C1 and C2, +(VR/2) is obtained on one of the inputs of AD1 and −(VR/2) is obtained on the other. If the gain of the differential amplifier based on AD1 is −1, i.e. if R11=R12=R13=R14, the voltage −VR is obtained on its output. Similarly, R21=R22=R23=R24, the subtract amplifier based on AS2 has a gain of −1 and zero output voltage is obtained: VE=(−VR+VR)=0 (for the input signal $V_R$).

On the other hand, the local telephone set sends a signal which produces on a, b and A voltages which are in phase on the negative input of AS2, and a signal $V_E$ proportional to the signal sent by the local telephone set appears on the output EM.

This shows the perfect separation is obtained between the outgoing and incoming channels. Diodes D11, D12, D13 and D14 protect the differential amplifier circuit. It may be seen here that 0 V obtained on the junction of R21 and R22 as soon as balance is achieved is due essentially to the equality of R21 and R22, whose other ends are connected to −VR and +VR respectively. Under these conditions, the subtract amplifier AS2 lets through no signal from the receive channel.

Input REC' of the device shown in FIG. 3 is simultaneously connected to an amplifier A1 having a gain of +1 and an amplifier B1 having a gain of −1. The outputs of A1 and B1 are designated A' and B' respectively, and are connected via resistors R'1 and R'2 to terminals a' and b'. In thepresent case, R'1=R'2=300 ohms. Terminals a' and b' are connected in the normal manner to the external network RES presenting an impedance Z2.

The output A' of A1 is connected to 0 V via two resistors R31 and R32 in series. The junction of R31 and R32 is also connected to 0 V by a series circuit consisting of a resistor R33, a resistor R34 and a capacitor C31. The junction of R33 and R34 is connected to the positive input of an operational amplifier A02, whose output is designated EM'.

Terminal a' is connected via a resistor R41 to the negative input of A02. A resistor R42 connects the negative input of A02 to its output. Resistors R41 and R42 are selected such that the value of R42 is double that of R41.

The signals appearing on REC' and EM' are designated $V_E$ and $V_R$ respectively.

The received signal VE is amplified simultaneously by A1 having a gain of +1 and by B1 which inverts the signal (a gain of −1). VE and −VE with respect to 0 V are thus obtained on A' and B', resulting in a potential difference of 2 VE between A' and B'. The gain g2 of this circuit is therefore 2.

The passive network CP2 consisting of resistors R31, R32, R33 and R34 and capacitor C31 produces a fraction K VE of the voltage VE on point A'. This fraction is applied to the positive input of amplifier A02, whilst the negative input is fed with the voltage $V_S$, being connected to point a' via resistor R41.

If g2=VR/VE, and substituting R2=R'1+R'2, VR on the output of A02 is given by:

$$VR = \left( -2VE \frac{Z2}{Z2 + R2} \right) + 3\,KVE$$

since the gain of amplifier A02 is −2 with respect to its negative input, and +3 with respect to its positive input, since the value of the negative feedback resistor R42 is twice that of R41. It is thus seen that:

$$g2 = 2\left( \frac{3K}{2} - \frac{Z2}{Z2 + R2} \right)$$

In order to obtain the best possible balance, it is necessary to reduce g2, i.e. select:

$$K = \text{approximately } \tfrac{2}{3} \times \frac{Z2}{Z2 + R2}$$

If R2=600 ohms, then:

$$K = \text{approximately } \tfrac{2}{3} \times \frac{Z2}{Z2 + 600}$$

Consequently, the values of R31, R32, R33, R34 and C31 must be selected as a function of this impedance 22. It is found in practice that in spite of the variation of Z2 with line length and signal frequency, if the value of K is selected for an average value of Z2, the problem of balancing is solved. If the impedance seen from points a and b in FIG. 2 is 600 ohms, it has been found that the condition 20 log VS/V'S<1 dB mentioned above is obtained if the components constituting network CP2 have the following values: R31=562Ω, R32=400Ω, R33=45 kΩ, R34=36 kΩ and C31=560 to 1000 pF. R31 and R32 are 1% resistors, whilst R33 and R34 are 5% resistors. Balance is thus obtained independently of frequency and line length and without adjustment. Manufacturing and maintenance costs are reduced since the large number of circuits (line circuits) are simple, the more complex part being reserved for the smaller number of devices (network junctors). As noted, the device consists of purely electronic circuits without the use of transformers.

We claim:

1. An electronic separation and balance device comprising a first two-to-four wire converter circuit connected between subscriber's telephone set lines and a four wire path, and a second two-to-four wire converter circuit connected between the four wire path and a network junctor, wherein said first two-to-four wire converter circuit comprises: first, second and third operational amplifiers, the input of said first amplifier being connected to the receive wires of the four wire path, and its output being connected to a transistor circit for forming a DC amplifier the balanced outputs of which are connected to the subscriber's telephone set lines through resistors of equal value, each of the inputs of said second amplifier being connected to the subscriber's telephone set lines through a capacitor in series with a resistor, and the (negative) input of said third amplifier being connected to the output of the second amplifier through a resistor and to one output of said DC amplifier through another resistor, the output of said third amplifier being connected to the transmit wires of the four wire path; means for preventing the voltages on inputs of said second and third amplifiers from being higher than a given positive low voltage and from being lower than a given negative low voltage; and means for preventing the voltage on the inputs of said first amplifier from being higher than a given positive low voltage; and wherein said second two-to-four wire converter comprises first, second and third operational amplifiers, said first and second amplifiers being connected to the transmit wires of the four-wire path, their outputs being coupled through resistors of equal value to the inputs of the network junctor, the (negative) input of said third amplifier being connected through a passive R.C. network to the output of said first amplifier, the (positive) input of said third amplifier being connected through a resistor to the input of the network junctor which is coupled to the output of said first amplifier, the output of said third amplifier being connected to the receive wires of the four-wire path.

2. An electronic separation and balance device according to claim 1 wherein in said DC amplifier: the (positive) input of said first amplifier is connected to the receiver wires of the four-wire path; the (negative) input of this first amplifier is connected to a first output of the DC amplifier through a resistor; the output of said first amplifier is connected to the base of a first transistor the emitter of which is connected to the base of a second transistor and to a positive low voltage through a resistor, the collector of this first transistor being connected to the base of a third transistor and to a high negative voltage through a resistor; the emitter of said second transistor is directly connected to the anode of a diode the cathode of which is connected to said first output of the DC amplifier; the collector of said third transistor is directly connected to said negative high voltage and its emitter is connected to the cathode of a diode to anode of which is connected to the second output of the DC amplifier, said first and second outputs of the DC amplifier being connected together through a resistor.

3. An electronic separation and balance device according to claim 2 wherein said means for preventing the voltage on the inputs of said first amplifier from being higher than a given positive low voltage comprise a resistor connected between the (positive) input of this amplifier and a zero voltage, and a diode the anode of which is connected to the (negative) input of this amplifier and the cathode of which is connected to a positive low voltage.

4. An electronic separation and balance device according to claim 3 wherein said positive low voltage is +5 Volts.

5. An electronic separation and balance device according to claim 2 wherein said positive low voltage is +5 Volts and wherein said negative high voltage is −48 Volts.

6. An electronic separation and balance device according to claim 1 wherein said means for preventing the voltages on inputs of said second and third amplifiers from being higher than a given positive low voltage comprise: a first diode the anode of which is connected to the (negative) input of the second amplifier and the cathode of which is connected to a positive low voltage; a second diode the cathode of which is connected to said (negative) input of the second amplifier and the anode of which is connected to a negative low voltage; a third diode the cathode of which is connected to the (positive) input of the second amplifier and the anode of which is connected to said negative low voltage; a fourth diode the anode of which is connected to said (positive) input of the second amplifier and the cathode of which is connected to said positive low voltage; a first resistor connected between said (positive) input of the second amplifier and a zero voltage; a second resistor connected between the output of this amplifier and its (negative) input; the (negative) input of said third amplifier being also connected to its output through a resistor and its (positive) input being connected to zero voltage through a resistor.

7. An electronic separation and balance device according to claim 6 wherein the values of said four resistors connected to the inputs of the second amplifier are all equal between each other, and wherein the values of said four resistors connected to the inputs of the third amplifier are all equal between each other.

8. An electronic separation and balance device according to claim 6 wherein said positive low voltage is +5 Volts and wherein said negative low voltage is −5 Volts.

9. An electronic separation and balance device according to claim 1 wherein the (negative) input of said third amplifier is also connected to its output through a resistor the value of which is twice that of said resistor connecting the (negative) input of this third amplifier to the network junctor.

10. An electronic separation and balance device according to claim 1 wherein said passive RC network comprises first and second resistors in series between the output of said first amplifier, the junction of said first and second resistors being connected to zero voltage through third and fourth resistors in series with a capacitor, the junction of said third and fourth resistors being connected to the (positive) input of said third amplifier.

11. An electronic separation and balance device according to claim 10 wherein the values of said first, second, third and fourth resistors are respectively: 562 ohms, 400 ohms, 45 kilohms, and 36 kilohms and wherein the value of said capacitor is comprised between 560 and 1000 pF, first and second resistors being 1% resistors and second and third resistors being 5% resistors.

* * * * *